(12) United States Patent
Baur et al.

(10) Patent No.: US 6,441,937 B1
(45) Date of Patent: Aug. 27, 2002

(54) OPTOELECTRONIC TRANSCEIVER MODULE, AND METHOD FOR RECEIVING OPTICAL SIGNALS

(75) Inventors: Elmar Baur; Hans Hurt, both of Regensburg; Josef Wittl, Parsberg, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/995,208

(22) Filed: Nov. 27, 2001

Related U.S. Application Data

(63) Continuation of application No. PCT/DE01/02466, filed on Jul. 3, 2001.

(51) Int. Cl.[7] .............................................. H04B 10/00
(52) U.S. Cl. ...................................... 359/152; 359/153
(58) Field of Search ................................ 359/110, 127, 359/152, 153, 154, 161, 177, 179, 187, 173; 385/14, 24, 139

(56) References Cited

U.S. PATENT DOCUMENTS

| | | | |
|---|---|---|---|
| 4,825,113 A | | 4/1989 | Sato et al. ....................... 370/2 |
| 5,448,663 A | * | 9/1995 | Faulkner et al. ............... 385/27 |
| 5,633,741 A | * | 5/1997 | Giles ........................... 359/124 |

FOREIGN PATENT DOCUMENTS

| | | |
|---|---|---|
| CA | 2178952 A1 | 6/1995 |
| FR | 2718587 A1 | 10/1995 |
| WO | WO 95/17053 | 6/1995 |

* cited by examiner

*Primary Examiner*—Leslie Pascal
*Assistant Examiner*—Dalzid Singh
(74) *Attorney, Agent, or Firm*—Laurence A. Greenberg; Werner H. Stemer; Gregory L. Mayback

(57) ABSTRACT

An optoelectronic transceiver module includes a coupler and an optoelectronic transmitter and receiver. The coupler couples one optical waveguide of one optical network. The coupler and network each have a reflection impulse response. The transceiver has a compensator generating an electrical correction signal using characteristic parameters of the reflection impulse response of the coupler and/or optical network and the electrical data signals of the transmitter, and uses the correction signal to correct the data signals received by the receiver. In the method, optical signals are received in a first transceiver from a second transceiver. Characteristic parameters of the reflection characteristics of the optical system coupled to the receiver in the first transceiver are determined, these parameters are used to generate a correction signal from the data signal to be sent from the first transceiver, and an electrical received signal is corrected in the first transceiver using the correction signal.

28 Claims, 4 Drawing Sheets

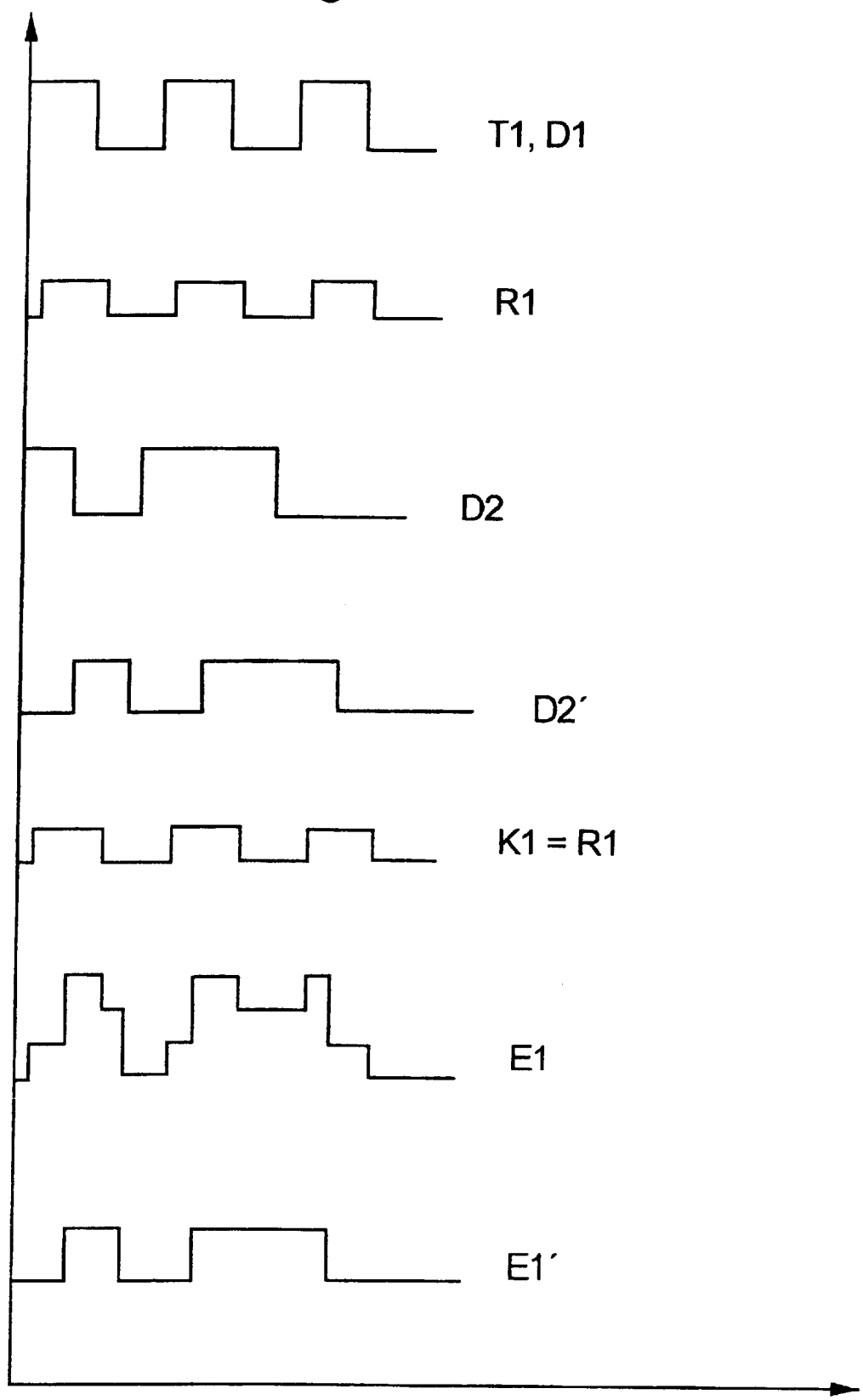

OPTOELECTRONIC TRANSCEIVER MODULE, AND METHOD FOR RECEIVING OPTICAL SIGNALS

CROSS-REFERENCE TO RELATED APPLICATION

This application is a continuation of copending International Application No. PCT/DE01/02466, filed Jul. 3, 2001, which designated the United States.

BACKGROUND OF THE INVENTION

Field of the Invention

The invention relates to an optoelectronic transceiver module having a coupling device for coupling at least one optical network through at least one optical waveguide, an optoelectronic transmitting apparatus that receives electrical data signals, converts them into optical data signals, and sends the signals through the coupling device to the optical network, and an optoelectronic receiving apparatus that receives the optical data signals passed through the coupling device from the optical network to the transceiver module and converts them into electrical data signals.

The invention also relates to a method for receiving optical signals having a first transceiver module with an optoelectronic transmitting and receiving device and a coupling device for coupling to an optical network. The optical data signals are sent from a second transceiver module through the optical network to the first transceiver module.

Such transceiver modules are normally used for bidirectional transmission of data in optical networks. If the transmitting apparatus in the transceiver (which, for example, has an LED or a laser) transmits optical signals, then a certain element of the signal is reflected on each optical boundary surface, which the signals strike on their path. Optical plug connections or optical boundary surfaces for inputting and outputting the light from and to a waveguide often have a completely unavoidable sudden change in the refractive index in the optical path of the light signals. Such a change necessarily leads to reflections.

It is disadvantageous if these reflections of the transmitted signals reach the receiving apparatus in the optoelectronic transceiver because they are superimposed on the received signals and, thus, corrupt the measurement result.

To insure that the bit error rate is at an acceptable level for the respective application despite the optical crosstalk, the detected, desired, received signals must be at a power level that is considerably greater than the power level of the undesirable reflected elements of the transmitted signals detected at the same time. Such a characteristic considerably reduces the limiting sensitivity of the transceiver.

One prior art technical solution to avoid the phenomenon is to use different optical carrier frequencies for the transmission and reception functions in the transceiver module. Frequency-selective components, for example, an optical filter, can be used to filter out the undesirable reflected elements of the transmitted frequency upstream of the receiving apparatus in a transceiver module. As such, the crosstalk can be reduced such that it is in the same order of magnitude as the attenuation of the frequency-selective optical component.

However, such a solution has the disadvantage that an additional optical component is required in the transceiver configuration. The additional component increases the production complexity and, thus, also results in higher transceiver costs.

SUMMARY OF THE INVENTION

It is accordingly an object of the invention to provide an optoelectronic transceiver module and a method for receiving optical signals that overcome the hereinafore-mentioned disadvantages of the heretofore-known devices and methods of this general type and that allows the optical crosstalk of the transmitting apparatus in the transceiver module into the receiving apparatus to be suppressed as easily and effectively as possible without using a frequency-selective optical component.

With the foregoing and other objects in view, there is provided, in accordance with the invention, an optoelectronic transceiver module for coupling optical waveguides in an optical network having a specific reflection impulse response, including a coupler for coupling at least one optical waveguide of an optical network, the coupler having a given reflection impulse response, an optoelectronic transmitter receiving electrical data signals and converting the electrical data signals into optical data signals, the transmitter connected to the coupler for sending the optical data signals to the optical network, an optoelectronic receiver connected to the coupler for receiving the optical data signals from the optical network through the coupler and converting the optical data signals into electrical data signals, and an electronic compensator connected to the transmitter and to the receiver, the compensator generating an electrical correction signal using characteristic parameters of the reflection impulse response of the coupler and/or the reflection impulse response of the optical network and the electrical data signals received by the transmitter, the compensator correcting the electrical data signals received by the receiver using the electrical correction signal.

As such, the effect of optical pulses that the transmitting apparatus in a transceiver module transmits being partially reflected on boundary surfaces of the optical network and then being passed to the receiving apparatus in the transceiver module (which is, in itself, undesirable) is made use of to actively correct the data signals, which are received by the receiving apparatus, from the coupled optical network. The undesirable interference signal can, thus, be decoupled from the wanted signal, so that the limiting sensitivity of the receiving apparatus in the transceiver is considerably increased.

Furthermore, there is no longer any need for any additional optical components to prevent the undesirable crosstalk from the transmitted signals to the received signals in the same transceiver module. Accordingly, the transceiver module construction is simplified and the cost is reduced.

In accordance with another feature of the invention, the data signals, which are sent by the transmitting apparatus, are essentially at the same frequency as the data signals that are received by the receiving apparatus in the transceiver module. The compensation apparatus according to the invention in the transceiver module has the effect of eliminating the need to use different frequencies for bidirectional transmission by two transceiver modules. The different frequencies were required to allow the use of frequency-selective optical components to suppress the crosstalk from the transmission channel onto the reception channel. Thus, using essentially identical optical transmission and reception frequencies, there is no need to provide different transceiver modules, whose optical transmission and reception frequencies respectively had to be compatible with one another. A bidirectional optical data transmission path can, thus, be formed by two identical transceiver modules, which reduces the costs and considerably increases the flexibility for construction and conversion of such optical systems.

In accordance with a further feature of the invention, the optical data signals sent by the transmitter are light at a given wavelength and the optical data signals received by the receiver are light substantially at the given wavelength.

In accordance with an added feature of the invention, the compensation apparatus in the transceiver module advantageously determines the characteristic parameters of the reflection impulse response of the coupling device and/or of the optical network by transmitting defined test signals by the transmitting apparatus, with the receiving apparatus receiving the reflected elements of these test signals, resolved based on time and amplitude. Thus, the specific parameters of the optical system, which is coupled to the transmitting apparatus, can be determined in a sort of calibration measurement. To such an end, the compensation apparatus has an evaluation device that uses the amplitude ratio and the phase relationship between the transmitted test signals and the received reflection elements of these test signals to electronically determine the attenuation and phase angle of the reflected impulse response of the connected optical network. These two characteristic parameters make it possible to calculate the reflection impulse response of the optical system that is coupled to the transmitting apparatus, for any given signal.

In accordance with an additional feature of the invention, the compensation apparatus preferably has an electronic memory device for storing the characteristic parameters of the reflection impulse response. The compensation apparatus can access the stored values to allow active correction of the signals received by the receiving apparatus.

In accordance with yet another feature of the invention, the transceiver module according to the invention has a combined transmitting/receiving apparatus, with the combined transmitting/receiving apparatus being coupled by a single optical waveguide section to the coupling device for coupling an optical waveguide of an optical network. The configuration allows the construction of the optical and optoelectronic components in the transceiver module to be simplified further because, for example, there is no need for an optical coupler in the optical waveguide for physically separate transmitting and receiving apparatuses.

In accordance with yet a further feature of the invention, an optical fiber is preferably provided as a single optical waveguide section, and is butt-coupled to the combined transmitting/receiving apparatus.

In accordance with yet an added feature of the invention, the transmitter/receiver includes an LED and a photodiode.

Together with a preferred embodiment of the combined transmitting/receiving apparatus as an LED combined with a photodiode, the exemplary embodiment represents a particularly cost-effective variant of the transceiver module according to the invention that is simple to manufacture.

In accordance with yet an additional feature of the invention, the combined LED and photodiode is preferably coated with an optically transparent synthetic resin, with the surface of the resin being curved such that light emitted from the LED falls on the core area of the optical fiber. The refractive optical characteristics of the resin, thus, allow the butt-coupling efficiency to be increased.

In accordance with again another feature of the invention, it is likewise feasible for the receiving apparatus and the transmitting apparatus in the transceiver module to be physically separated from one another. In such an embodiment, both the transmitting apparatus and the receiving apparatus are each optically coupled to an optical waveguide section, with the two optical waveguide sections being combined by an optical coupling element to form a single optical waveguide section that is coupled at its end to the coupling device in the transceiver module. Such a construction is advantageous when the desired optoelectronic transmitting and receiving apparatuses cannot physically be integrated, or can be done only subject to disadvantages. Such a case may exist, in particular, when monomode optical waveguides and narrowband semiconductor lasers are intended to be used as the transmitting apparatus.

Such a configuration with physically separated transmitting and receiving apparatuses preferably has an optical coupling element, which preferably passes the data signals, which are passed from the optical network to the transceiver, to the receiving apparatus in the transceiver module. The use of such a directional coupler ensures that as little as possible of the transmitted data reaches the transmission apparatuses in the transceiver module at the receiver end.

In accordance with again a further feature of the invention, there are provided optical waveguide sections. Each of the transmitter and the receiver are optically coupled to a respective one of the optical waveguide sections. Two of the optical waveguide sections are combined with an optical coupling element to form a single optical waveguide section coupled to the coupler for connecting the coupler to an optical waveguide of the optical network.

In accordance with again an added feature of the invention, the optical coupling element carries optical data signals passed from the optical network to the receiver.

In accordance with again an additional feature of the invention, it is advantageous for the compensation apparatus to be in a form that the generated electrical correction signal is subtracted from the electrical data signal of the receiving apparatus. The feature is dependent on the optical signal, which is passed to the receiving apparatus being converted by the receiving apparatus in purely linear form to an electrical signal, and depends on the electro-optical characteristic of the receiving apparatus.

In accordance with still another feature of the invention, there is provided a common housing. The transmitter, the receiver, and the compensator are disposed in the common housing. The coupler connects an optical waveguide to the common housing.

With the objects of the invention in view, there is also provided a method for receiving optical data signals from an optical network, including the steps of coupling a first transceiver module having an optoelectronic transmitting and receiving device to the optical network with a coupler, sending the optical data signals from a second transceiver module through the optical network to the first transceiver module, transmitting optical test signals at a defined amplitude and frequency with the first transceiver module, receiving reflected elements of the transmitted optical test signals with the first transceiver module, determining characteristic parameters of reflection characteristics by comparing the transmitted optical test signals and the received reflected elements, transmitting optical data signals with the first transceiver module, transmitting optical data signals with the second transceiver module, receiving optical signals with the first transceiver module, generating a correction signal using the characteristic parameters of the reflection characteristics and of the transmitted optical data from the first transceiver module, and correcting the received signals using the correction signal.

The method of the invention can be used universally for any desired optical networks, which are coupled to the transceiver module. The transmission of the test signals and the reception of the reflected elements of the test signals represent a sort of calibration measurement for the coupled optical network. If required, the measurement can be repeated at any time, so that the determined parameters for the reflection characteristics of the coupling device and of the coupled optical network always correspond to the characteristics of the optical system.

In accordance with still a further mode of the invention, it is advantageous for the reflected elements of the transmitted optical test signals to be received resolved based upon time and amplitude, so that the attenuation and phase angle of the reflected elements are determined, in comparison to the transmitted optical test signals, as characteristic parameters of the reflection characteristics.

Furthermore, in accordance with still an added mode of the invention, the received optical signals are preferably corrected in real time using the correction signals, so that there is no additional time delay in the transmission of the data.

However, it is likewise feasible, in accordance with still an additional mode of the invention, for the received optical signals to be corrected when required only after a time delay, using the correction signals.

For the already mentioned reasons, in accordance with a concomitant mode of the invention, light at essentially the same wavelength is preferably used for transmitting the optical data from the first transceiver module and for transmitting the optical data from the second transceiver module.

Other features that are considered as characteristic for the invention are set forth in the appended claims.

Although the invention is illustrated and described herein as embodied in an optoelectronic transceiver module, and a method for receiving optical signals, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 6 is a signal flow diagram of signal profiles of transmitted and received signals for a method for receiving optical signals in the transceiver modules according to the invention.

DESCRIPTION OF THE PREFERRED EMBODIMENTS

Figure 1:
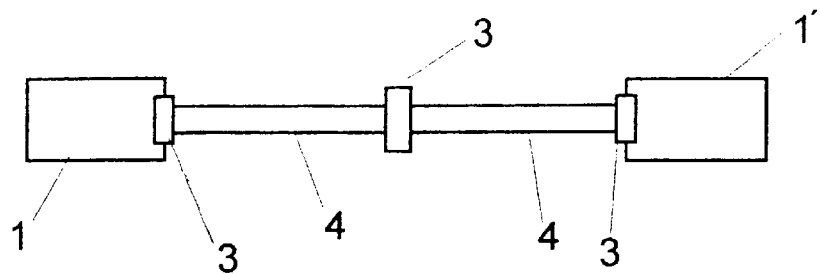
FIG. 1 is a schematic illustration of an optical data transmission path with two transceiver modules according to the invention.

Referring now to the figures of the drawings in detail and first, particularly to FIG. 1 thereof, there is shown two optoelectronic transceiver modules 1, 1', which are coupled to one another through optical waveguides 4. Both transceiver modules 1, 1' have optoelectronic transmitting apparatuses, whose light is coupled into the respective waveguides 4. At the same time, each transceiver module 1, 1' has a receiving apparatus that receives the transmitted light signals from the respective other transceiver module. Thus, the optical system is configured for bidirectional transmission and reception of optical data.

Due to the sudden change in the refractive index at the end surface of the optical waveguide, reflections necessarily occur in coupling devices 3 that, for example, are in the form of optical plug connections. Thus, in particular, the signals transmitted from the transceiver modules 1, 1' are partially reflected at such coupling areas 3 and pass back on such a route into the transceiver modules 1, 1'. When the reflected signal elements reach the receiving devices, they act as interference because they are superimposed on the desired received signals during the optoelectrical conversion process. The crosstalk from the transmitted signal onto the received signal considerably reduces the limiting sensitivity of the detector in the receiving apparatus. The reduction is due to the fact that, with digital transmission, there must be an adequate difference in levels between the signal that is the source of the crosstalk and the desired received signal, in order to make possible a satisfaction of the required bit error rate.

Figure 2:
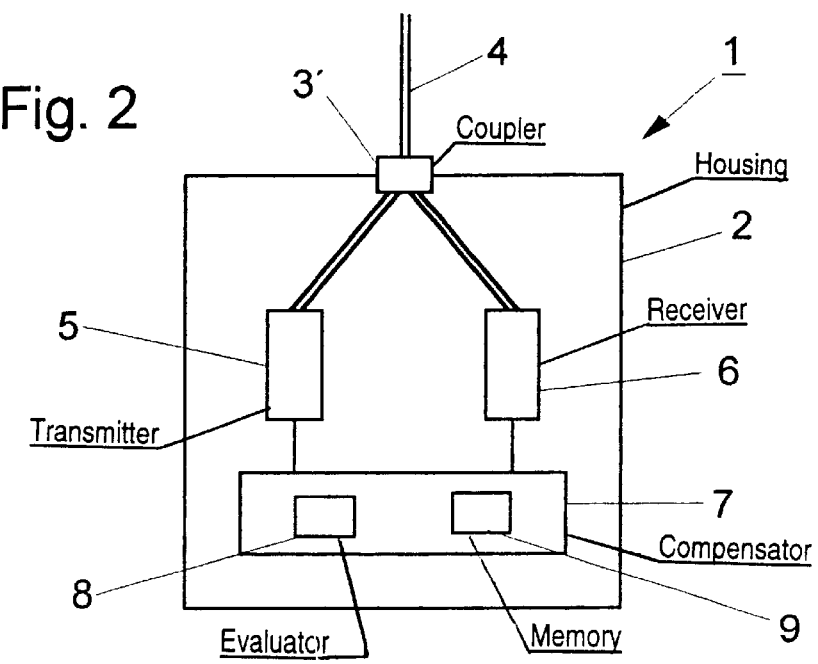
FIG. 2 is a fragmentary, block circuit diagram of a transceiver module according to the invention.

FIG. 2 shows a schematic illustration of the transceiver module 1 according to the invention. An optoelectronic transmitting apparatus 5 and an optoelectronic receiving apparatus 6 are disposed separately from one another in a common housing 2. Both apparatuses are optically coupled through optical waveguide sections to an optical coupling device 3' that is preferably disposed on an outer wall of the housing. The coupling device 3' allows the connection of at least one optical waveguide 4 of at least one optical network. The optical waveguides can be either in the form of fiber waveguides or in the form of integrated optical waveguides.

Furthermore, an electronic compensation apparatus 7 is disposed in the housing 2 and is electronically coupled to the transmitting apparatus 5 and to the receiving apparatus 6. The compensation apparatus 7 has an evaluation device 8 and a memory device 9. The evaluation device 8 compares the amplitude levels and phase angles of the test signals transmitted from the transmitting apparatus 5 with the reflected elements of the transmitted test signals received by the receiving apparatus 6. As such, it is possible to determine the reflection characteristics of the optical system that is coupled to the transmitting apparatus and that includes the optical waveguide section as far as the coupling device 3', and the optical network that is coupled there. The characteristics normally include attenuation and a phase shift. Depending on the number of reflection areas and the attenuation in the optical system, a single transmitted pulse can initiate a large number of "multiple" reflections that can be measured by the receiving apparatus. The "echo" of the pulse is referred to as the reflection impulse response. If the characteristic parameters of the reflection impulse response, such as the attenuation and phase shift, are known, it is easily possible for the compensation apparatus 7 to use the electrical transmitted signals from the transmitting apparatus 5 to generate the electrical interference signal in the reflected elements of the transmitted signals. Using the generated interference signal, it is feasible to apply electronic correction to the electrical received signal in the receiving apparatus 6. If the receiving apparatus 6 has a linear characteristic for electro-optical conversion, and the optical intensities that occur are in the linear range, the electrical received signal can be corrected by electronic subtraction of the generated interference signal.

Such correction is, in principle, also feasible for nonlinear operation, or if the receiving apparatus has a nonlinear characteristic. In such a case, the compensation apparatus has to know the nonlinear characteristics of the receiving apparatus, and has to take these characteristics into account in an appropriate manner, depending on the intensity of the generated interference signal.

Figure 3:
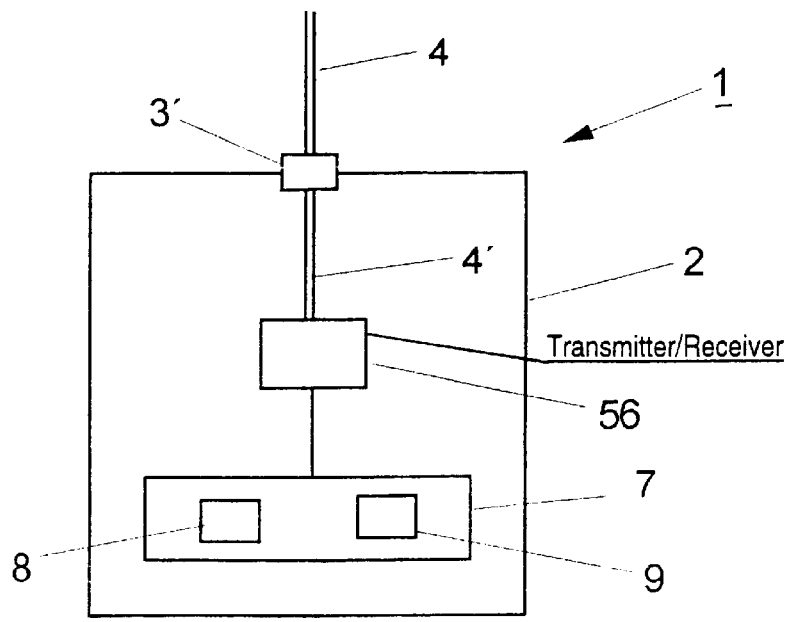
FIG. 3 is a fragmentary, block circuit diagram of a second embodiment of the transceiver module of FIG. 2 with a combined transmitting/receiving apparatus.

FIG. 3 illustrates a second embodiment of the transceiver module 1. In contrast to the first embodiment shown in FIG. 2, a combined optoelectronic transmitting/receiving apparatus 56 is provided. Consequently, a single optical waveguide section 4' is sufficient to couple the combined transmitting/receiving apparatus 56 optically to the coupling device 3'.

Figure 4A:
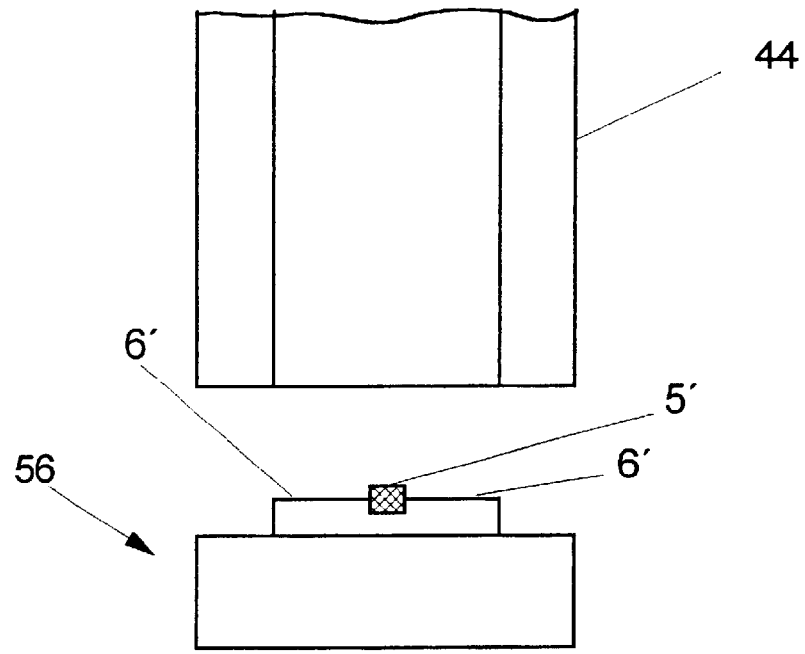
FIG. 4a is an enlarged, fragmentary, cross-sectional view of an embodiment of the transmitting/receiving apparatus of FIG. 3.

One possible embodiment of a combined transmitting/receiving device 56 is shown in FIG. 4a. An optical fiber 44, whose end surface is butt-coupled to the combined transmitting/receiving apparatus 56, is provided as the optical waveguide section. The combined transmitting/receiving apparatus 56 has an LED 5' and a photodiode 6' that, for example, are manufactured such that they are integrated in one another using hybrid technology. Due to the small geometric size, which can be achieved by the embodiment, it is possible to couple the optical fiber 44 by a butt connection directly from its polished end surface to the combined transmitting/receiving apparatus 56. Particularly when using multimode optical fibers, in particular, composed of plastic, the illustrated optical coupling of the combined transmitting and receiving apparatus represents a cost-effective embodiment of the transceiver module according to the invention.

The same variant of the coupling is, however, in principle also feasible for monomode fiber waveguides. Narrowband laser diodes or VCSEL can likewise be used as the transmitting apparatus 5'. With such components, a monolithic construction including the LED, laser diode, or VCSEL and associated photodiode is also feasible.

Figure 4B:
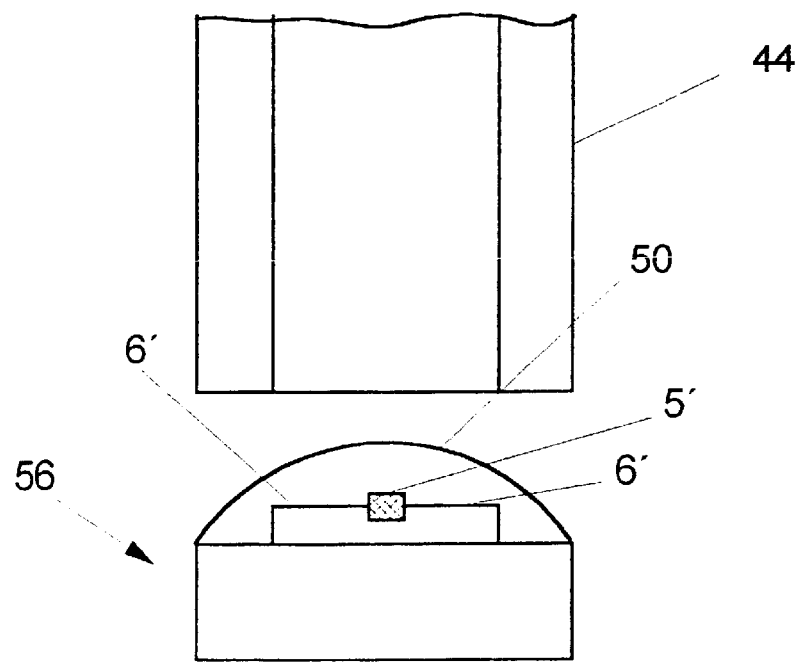
FIG. 4b an enlarged, fragmentary, cross-sectional view of an alternative embodiment of the transmitting/receiving apparatus of FIG. 3.

FIG. 4b shows a modification of the optical coupling illustrated in FIG. 4a. In the embodiment, the transmitting apparatus 5' and the receiving apparatus 6' are coated with an optically transparent synthetic resin coating 50. The synthetic resin coating 50, which is often used for protection of the optoelectronic components, has a curvature that guides the light transmitted from the transmitting apparatus 5' to the core area of the optical fiber 44 and, conversely, guides the light signals to be received from the core area of the optical fiber to the receiving apparatus 6'. Such a configuration increases the optical coupling efficiency. Furthermore, it is also feasible to introduce a non-illustrated gel with a matched index between the end surface of the optical fiber 44 and the synthetic resin layer.

Figure 5:
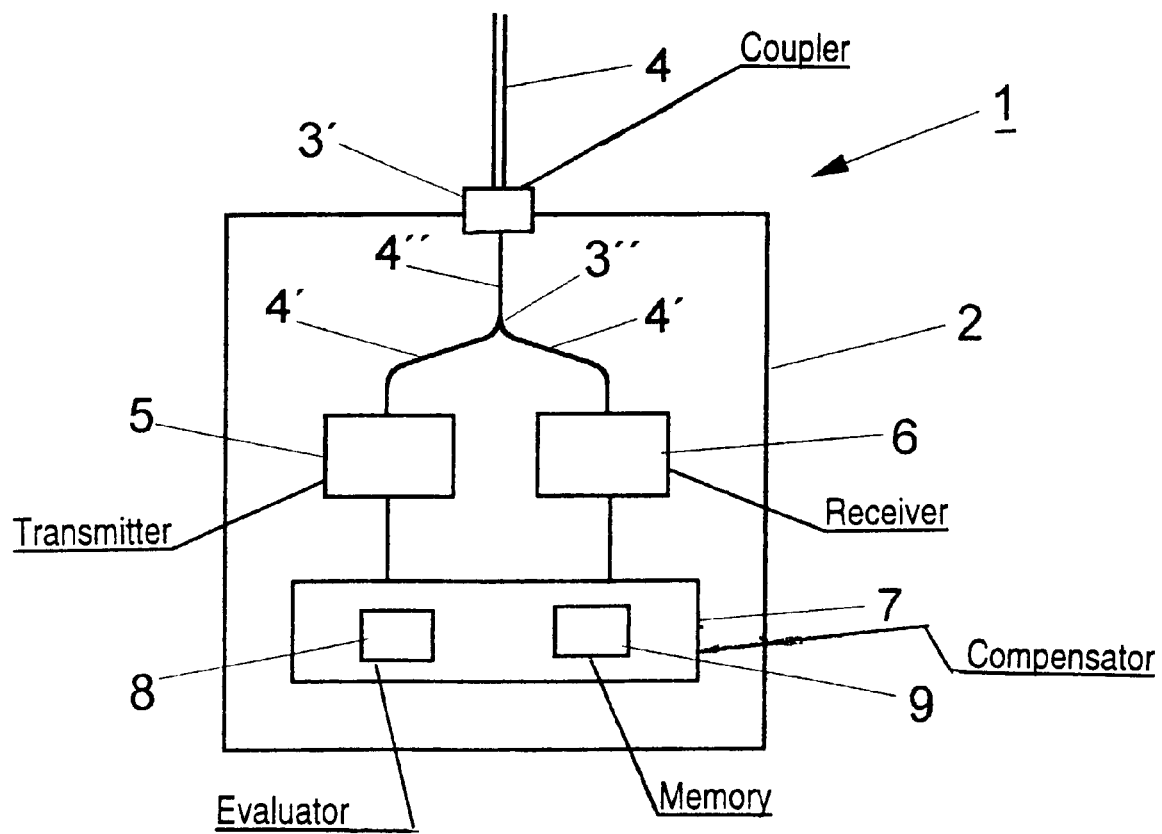
FIG. 5 is a fragmentary, block circuit diagram of a third embodiment of the transceiver module of FIG. 2 with physically separated transmitting and receiving apparatuses.

FIG. 5 shows the schematic layout of a third embodiment of a transceiver module 1. The layout is essentially the same as that of the first embodiment shown in FIG. 2. Identical components are, therefore, provided with the same reference symbols. In contrast to the transceiver module illustrated in FIG. 2, both the transmitting apparatus 5 and the receiving apparatus 6 are optically coupled to optical waveguide sections 4'. These optical waveguide sections 4' are then coupled through a common optical coupling element 3' to a further optical waveguide section 4" whose other end is coupled to the coupling device 3' disposed on the housing 2. Directional couplers, in particular, may be used as the optical coupling element 3' that pass the signals to be received from the optical network to the receiving apparatus in a preferred manner. Alternatively, it is also possible to use a simple, integrated, optical Y-splitter or a fusion-type coupler for fiber waveguides.

FIG. 6 uses single profiles to illustrate schematically a way in which the method according to the invention operates. The first transceiver module transmits a test signal sequence T1, whose reflected element R1 is detected by the first transceiver module with a phase-shift and reduced amplitude. To simplify the illustration, the optical system, which is coupled to the receiving apparatus 6, 6' in the transceiver module 1, 1' has only one reflection area so that each test pulse in the sequence T1 causes only one reflected pulse in the signal R1. As already explained, the attenuation and the phase shift of the reflection impulse response of the coupled optical system are determined from the amplitude ratios and the phase angles between the signals T1 and R1.

The second transceiver module sends data signals D2. After a certain delay time, which leads to a phase shift, the data signal D2 arrive as signals D2' at the first transceiver module. The first transceiver module at the same time sends data signals D1, which, for the sake of simplicity, are chosen to be identical to the test signal sequence T1. The first transceiver module, thus, receives the superposition of the signals D2' and R1, which is linear in the present case, and leads to a received signal E1 that is subject to interference.

The correction signal K1 to be generated corresponds to the reflection response of the data signals D1, that is to say, to the signal R1. If the signal R1 is now subtracted from the signal E1, the subtraction results in the desired received signal E1' in the first transceiver module, which corresponds to the data transmitted by the second transceiver module.

As already mentioned, the method is, in principle, also applicable to optical systems that have more complex reflection impulse responses with multiple reflections. Furthermore, a nonlinear optoelectronic receiving apparatus can be taken into account in the correction of the received signal E1 based on the knowledge of its nonlinear characteristic.

Furthermore, it is, of course, expedient to use the described method in a bidirectional transmission path for both transceiver modules.

We claim:

1. An optoelectronic transceiver module for coupling optical waveguides in an optical network having a specific reflection impulse response, comprising:
   a coupler for coupling at least one optical waveguide of the optical network, said coupler having a given reflection impulse response;
   an optoelectronic transmitter receiving electrical data signals and converting the electrical data signals into optical data signals, said transmitter connected to said coupler for sending the optical data signals to the optical network;
   an optoelectronic receiver connected to said coupler for receiving the optical data signals from the optical network through said coupler and converting the optical data signals into electrical data signals; and
   an electronic compensator connected to said transmitter and to said receiver, said compensator generating an electrical correction signal using characteristic parameters of at least one of said reflection impulse response of said coupler and the reflection impulse response of the optical network and the electrical data signals received by said transmitter, said compensator correcting the electrical data signals received by said receiver using said electrical correction signal.

2. The optoelectronic transceiver module according to claim 1, wherein:
the optical data signals sent by said transmitter are light at a given wavelength; and
the optical data signals received by said receiver are light substantially at said given wavelength.

3. The optoelectronic transceiver module according to claim 1, wherein said compensator determines the characteristic parameters of at least one of said reflection impulse response of said coupler and the reflection impulse response of the optical network by sending defined test signals through said transmitter and said receiver receiving reflected elements of said test signals resolved based upon time and amplitude.

4. The optoelectronic transceiver module according to claim 3, wherein said compensator has an evaluation device electronically determining an attenuation and a phase angle of the reflection impulse response of the optical network using an amplitude ratio and a phase relationship between said test signals transmitted and said reflected elements of said test signals received.

5. The optoelectronic transceiver module according to claim 3, wherein said compensator has an electronic memory device for storing the characteristic parameters.

6. The optoelectronic transceiver module according to claim 1, wherein:
said transmitter and said receiver are combined into a transmitter/receiver; and
a single optical waveguide section is optically coupled to said transmitter/receiver and to said coupler for coupling said waveguide section to the optical waveguide.

7. The optoelectronic transceiver module according to claim 6, wherein:
said waveguide section is an optical fiber; and
said optical fiber is butt-coupled to said transmitter/receiver.

8. The optoelectronic transceiver module according to claim 7, wherein said transmitter/receiver includes an LED and a photodiode.

9. The optoelectronic transceiver module according to claim 8, wherein:
said optical fiber has a core area;
said LED and said photodiode are coated with an optically transparent synthetic resin; and
said resin is curved such that light emitted from said LED falls on said core area.

10. The optoelectronic transceiver module according to claim 1, wherein said transmitter and said receiver are disposed physically separated from one another.

11. The optoelectronic transceiver module according to claim 10, including optical waveguide sections, each of said transmitter and said receiver being optically coupled to a respective one of said optical waveguide sections, two of said optical waveguide sections being combined with an optical coupling element to form a single optical waveguide section coupled to said coupler for connecting said coupler to an optical waveguide of the optical network.

12. The optoelectronic transceiver module according to claim 11, wherein said optical coupling element carries optical data signals passed from the optical network to said receiver.

13. The optoelectronic transceiver module according to claim 1, wherein said compensator subtracts said electrical correction signal from the electrical data signals output by said receiver.

14. The optoelectronic transceiver module according to claim 1, including a common housing, said transmitter, said receiver, and said compensator being disposed in said common housing, said coupler connecting an optical waveguide to said common housing.

15. A method for receiving optical data signals from an optical network, which comprises:
coupling a first transceiver module having an optoelectronic transmitting and receiving device to the optical network with a coupler;
sending the optical data signals from a second transceiver module through the optical network to the first transceiver module;
transmitting optical test signals at a defined amplitude and frequency with the first transceiver module;
receiving reflected elements of the transmitted optical test signals with the first transceiver module;
determining characteristic parameters of reflection characteristics by comparing the transmitted optical test signals and the received reflected elements;
transmitting optical data signals with the first transceiver module;
transmitting optical data signals with the second transceiver module;
receiving optical signals with the first transceiver module;
generating a correction signal using the characteristic parameters of the reflection characteristics and of the transmitted optical data from the first transceiver module; and
correcting the received signals using the correction signal.

16. The method for receiving optical data signals according to claim 15, which further comprises receiving the reflected elements of the transmitted optical test signals resolved based upon time and amplitude.

17. The method for receiving optical data signals according to claim 16, which further comprises determining the characteristic parameters attenuation and phase angle of the reflection characteristics by comparing the transmitted optical test signals to the reflected elements of the transmitted optical test signals.

18. The method for receiving optical data signals according to claim 17, which further comprises correcting the received optical signals in real time using the correction signals.

19. The method for receiving optical data signals according to claim 17, which further comprises correcting the received optical signals after a time delay using the correction signals.

20. The method for receiving optical data signals according to claim 17, characterized in that light at essentially the same wavelength is used for transmitting the optical data from the first transceiver module and for transmitting the optical data from the second transceiver module.

21. The method for receiving optical data signals according to claim 16, which further comprises correcting the received optical signals in real time using the correction signals.

22. The method for receiving optical data signals according to claim 16, which further comprises correcting the received optical signals after a time delay using the correction signals.

23. The method for receiving optical data signals according to claim 16, characterized in that light at essentially the same wavelength is used for transmitting the optical data from the first transceiver module and for transmitting the optical data from the second transceiver module.

24. The method for receiving optical data signals according to claim 15, which further comprises correcting the received optical signals in real time using the correction signals.

25. The method for receiving optical data signals according to claim 24, characterized in that light at essentially the same wavelength is used for transmitting the optical data from the first transceiver module and for transmitting the optical data from the second transceiver module.

26. The method for receiving optical data signals according to claim 15, which further comprises correcting the received optical signals after a time delay using the correction signals.

27. The method for receiving optical data signals according to claim 26, characterized in that light at essentially the same wavelength is used for transmitting the optical data from the first transceiver module and for transmitting the optical data from the second transceiver module.

28. The method for receiving optical data signals according to claim 15, characterized in that light at essentially the same wavelength is used for transmitting the optical data from the first transceiver module and for transmitting the optical data from the second transceiver module.

* * * * *